US007546137B2

(12) United States Patent
D'Hont et al.

(10) Patent No.: US 7,546,137 B2
(45) Date of Patent: Jun. 9, 2009

(54) POWER CONTROL LOOP AND LO GENERATION METHOD

(75) Inventors: Loek J. D'Hont, Rotonda-West, FL (US); Bernard Barink, McKinney, TX (US)

(73) Assignee: Sirit Technologies Inc. (CA)

( * ) Notice: Subject to any disclaimer, the term of this patent is extended or adjusted under 35 U.S.C. 154(b) by 663 days.

(21) Appl. No.: 11/362,622

(22) Filed: Feb. 27, 2006

(65) Prior Publication Data

US 2007/0066223 A1 Mar. 22, 2007

Related U.S. Application Data

(60) Provisional application No. 60/657,120, filed on Feb. 28, 2005.

(51) Int. Cl.
*H04B 7/00* (2006.01)
(52) U.S. Cl. ............... 455/522; 455/114.2; 455/114.3; 455/115.1; 455/127.1; 375/296; 375/254; 370/282
(58) Field of Classification Search ............ 455/522, 455/114.2, 114.3, 115.1, 127.1, 13.4; 375/296, 375/254, 278, 284; 370/282
See application file for complete search history.

(56) References Cited

U.S. PATENT DOCUMENTS

| 4,134,068 | A | * | 1/1979 | Richardson | ........ 455/19 |
|---|---|---|---|---|---|
| 4,309,771 | A | * | 1/1982 | Wilkens | ........ 375/285 |
| 4,924,171 | A |   | 5/1990 | Baba et al. | |
| 4,926,868 | A | * | 5/1990 | Larsen | ........ 600/407 |
| 5,216,430 | A |   | 6/1993 | Rahm et al. | |
| 5,448,110 | A | * | 9/1995 | Tuttle et al. | ........ 257/723 |
| 5,661,494 | A |   | 8/1997 | Bondyopadhyay et al. | |
| 5,776,278 | A | * | 7/1998 | Tuttle et al. | ........ 156/213 |
| 5,838,730 | A | * | 11/1998 | Cripps | ........ 375/272 |
| 5,857,003 | A | * | 1/1999 | Geiger et al. | ........ 375/319 |
| 6,005,506 | A | * | 12/1999 | Bazarjani et al. | ........ 341/143 |
| 6,045,652 | A | * | 4/2000 | Tuttle et al. | ........ 156/292 |
| 6,097,301 | A | * | 8/2000 | Tuttle | ........ 340/693.9 |
| 6,211,663 | B1 | * | 4/2001 | Moulthrop et al. | ....... 324/76.23 |

(Continued)

FOREIGN PATENT DOCUMENTS

EP        0382695        8/1990

(Continued)

OTHER PUBLICATIONS

International Search Report and Written Opinion of the international Searching Authority mailed Aug. 28, 2006 for PCT Application No. PCT/US2006/007127, 9 pages.

(Continued)

*Primary Examiner*—Matthew D Anderson
*Assistant Examiner*—Minh D Dao
(74) *Attorney, Agent, or Firm*—Fish & Richardson P.C.

(57) ABSTRACT

A method for use in a RFID reader, the method comprising providing an output signal from an amplifier of a transmitter, attenuating the output signal via a step attenuator, detecting and comparing the attenuated output signal to a reference value, and adjusting power to the amplifier until the attenuated output signal is substantially equal to the reference value. The attenuated output signal drives a local oscillator signal of a receiver thereby canceling noise generated by the transmitter in the receiver.

20 Claims, 7 Drawing Sheets

U.S. PATENT DOCUMENTS

| | | | |
|---|---|---|---|
| 6,307,896 B1* | 10/2001 | Gumm et al. | 375/316 |
| 6,731,199 B1* | 5/2004 | Ueda | 340/10.4 |
| 6,819,720 B1* | 11/2004 | Willetts | 375/296 |
| 6,853,837 B1* | 2/2005 | Oda | 455/234.1 |
| 7,265,478 B2* | 9/2007 | Thiesen | 310/313 R |
| 7,321,641 B2* | 1/2008 | Moulthrop et al. | 375/332 |
| 2004/0192247 A1 | 9/2004 | Rotta et al. | |
| 2006/0126754 A1* | 6/2006 | Filimonov et al. | 375/296 |
| 2007/0066224 A1* | 3/2007 | d'Hont et al. | 455/41.2 |
| 2007/0207284 A1* | 9/2007 | McClintic | 428/40.1 |
| 2008/0081551 A1* | 4/2008 | Posamentier | 455/1 |
| 2008/0117025 A1* | 5/2008 | Tuttle | 340/10.3 |
| 2008/0191847 A1* | 8/2008 | August et al. | 340/10.42 |
| 2008/0238622 A1* | 10/2008 | Rofougaran et al. | 340/10.1 |
| 2008/0278287 A1* | 11/2008 | Virnich et al. | 340/10.1 |
| 2008/0293352 A1* | 11/2008 | Posamentier | 455/1 |

FOREIGN PATENT DOCUMENTS

| | | |
|---|---|---|
| EP | 0930668 | 7/1999 |
| EP | 0973231 | 1/2000 |
| EP | 1383200 | 1/2004 |
| WO | WO 91/07736 | 5/1991 |

OTHER PUBLICATIONS

International Search Report and Written Opinion of the International Searching Authority issued in International Application No. PCT/US2006/007129; Aug. 28, 2006; 11 pages.

International Preliminary Report on Patentability under Chaper 1 issued in International Application No. PT/US2006/007129; Sep. 20, 2007; 8 pages.

International Search Report and Written Opinion of the International Searching Authority issued in International Application No. PCT/US2006/007128; May 26, 2006; 16 pages.

Huang, C.Y. et al.; "Broadband Circularly Polarised Square Microstrip Antenna Using Chip-Resistor Loading"; IEE Proceedings: Microwaves, Antennas and Propagation; IEE, Stevenage, Herts, GB; vol. 146, No. 1; Feb. 9, 1999; pp. 94-96.

Huang, Chih-Yu et al.; "Gain-Enhanced Compact Broadband Microstrip Antenna"; Electronics Letters; IEE Stevenage, GB; vol. 34, No. 2; Jan. 22, 1998; pp. 138-139.

Timofeev I.E. et al.; "Wideband Microstrip Array Antenna with Sidelobe Cancellation Channels"; Electronics Letters; IEE Stevenage, GB; vol. 34, No. 6; Mar. 19, 1998; pp. 505-506.

International Preliminary Report on Patentability under Chapter 1 issued in International Application No. PCT/US2006/007128; Sep. 20, 2007; 11 pages.

International Preliminary Report on Patentability under Chapter 1 issued in International Application No. PCT/Us2006/007127; Sep. 20, 2007; 7 pages.

* cited by examiner

POWER CONTROL LOOP AND LO GENERATION METHOD

PRIORITY DATA

This application claims the benefit of U.S. Provisional Application Ser. No. 60/657,120 entitled "RFID DEVICE AND METHOD," filed Feb. 28, 2005.

BACKGROUND

RFID or radio frequency identification technology has been used in a variety of commercial applications such as inventory tracking and highway toll tags. In general, a transceiver tag or transponder transmits stored data by backscattering varying amounts of an electromagnetic field generated by an RFID reader. The RFID tag may be a passive device that derives its electrical energy from the received electromagnetic field or may be an active device that incorporates its own power source. The backscattered energy is then read by the RFID reader and the data is extracted therefrom.

The RFID reader includes a transmitter that provides the electrical energy or information to the RFID tag. To accomplish this, the transmitter employs a power amplifier to drive an antenna with an unmodulated or modulated output signal. Traditionally, in order to generate highly controlled (i.e., shaping the modulation wave in order to minimize unwanted spectral content) amplitude modulation (AM) for the output signal, a highly linear power amplifier running in Class-A mode has been used. However, RFID readers that utilize Class-A power amplifiers are inefficient, require more of heat-sinking, and have poor noise figure. Additionally, these readers are not operable under certain applications such as Power Over Ethernet (POE) which have maximum power consumption requirements.

Various methods have been used to control the power output of the RFID reader. Many of them involve calibrating each individual power output setting step during the reader production process. This requires complex algorithms or lookup tables and time consuming calibration procedures. What is needed is a method for controlling the power output of the RFID reader that allows for accurate steps in the power output setting without requiring large firmware overhead.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
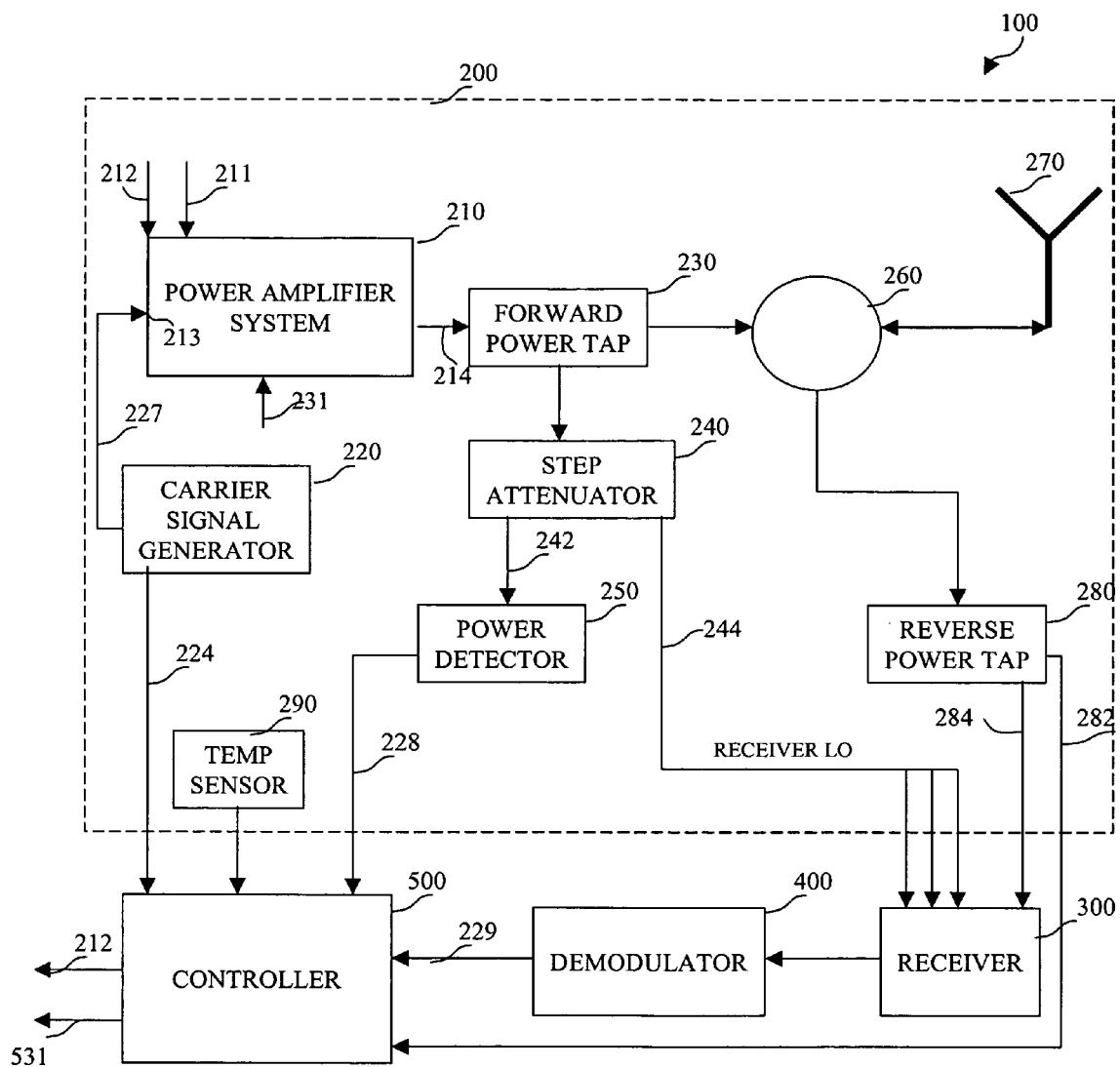
FIG. 1 is a simplified schematic diagram of an embodiment of an RFID reader.

FIG. 1 is a simplified schematic diagram of an embodiment of an RFID reader 100. Although the reader 100 is described in the context of RFID, it may be adapted for use in non-RFID applications. The reader 100 comprises a receiver 300 that uses multiple mixers or multipliers. An example of a receiver that may be used in this embodiment is described in co-pending U.S. patent application Ser. No. 10/992,958, filed Nov. 19, 2004, entitled "HOMODYNE RFID RECEIVER AND METHOD," which is incorporated herein by reference. The reader 100 also comprises a transmitter 200 that is coupled to the receiver 300 and a controller 500. A demodulator 400 such as an amplitude shift keying (ASK) demodulator is coupled to the receiver 300 and the controller 500. The receiver 300 may be followed by an optional subcarrier demodulator depending on the RFID protocol used.

The transmitter 200 comprises a power amplifier (PA) system 210 coupled to a forward power tap 230. The forward power tap 230 includes a directional coupler to feed a portion of the output signal coming from the PA system 210 to a step attenuator 240. The output of the step attenuator 240 is split, a portion 242 is fed to a power detector 250 and the other portion 244 is provided to the receiver 300 to drive a local oscillator (LO) signal therein. The output 228 of the power detector 250 is coupled to the controller 500. The forward power tap 230 is also coupled to a circulator 260 which is coupled to an antenna 270. An example of an antenna that may be used in this embodiment is described in co-pending U.S. patent application Ser. No. 11/362,951 entitled "CIRCULARLY POLARIZED SQUARE PATCH ANTENNA," which is incorporated herein by reference. The circulator 260 is operable to isolate the receive path from the transmit path when one antenna is used. Alternatively, the reader 100 may employ two antennas, one for the transmitter 200 and one for the receiver 300 including an optional antenna switch. The circulator 260 is also coupled to a reverse power tap 280. The reverse power tap 280 may use a directional coupler to obtain a portion 282 of a reflected transmitted power and feeds this into a power detector in the controller 500 to detect mismatch. The other portion 284 is the received signal coming from the reverse power tap 280 which is received from the antenna 270 and is fed into the receiver 300 for processing.

Figure 2:
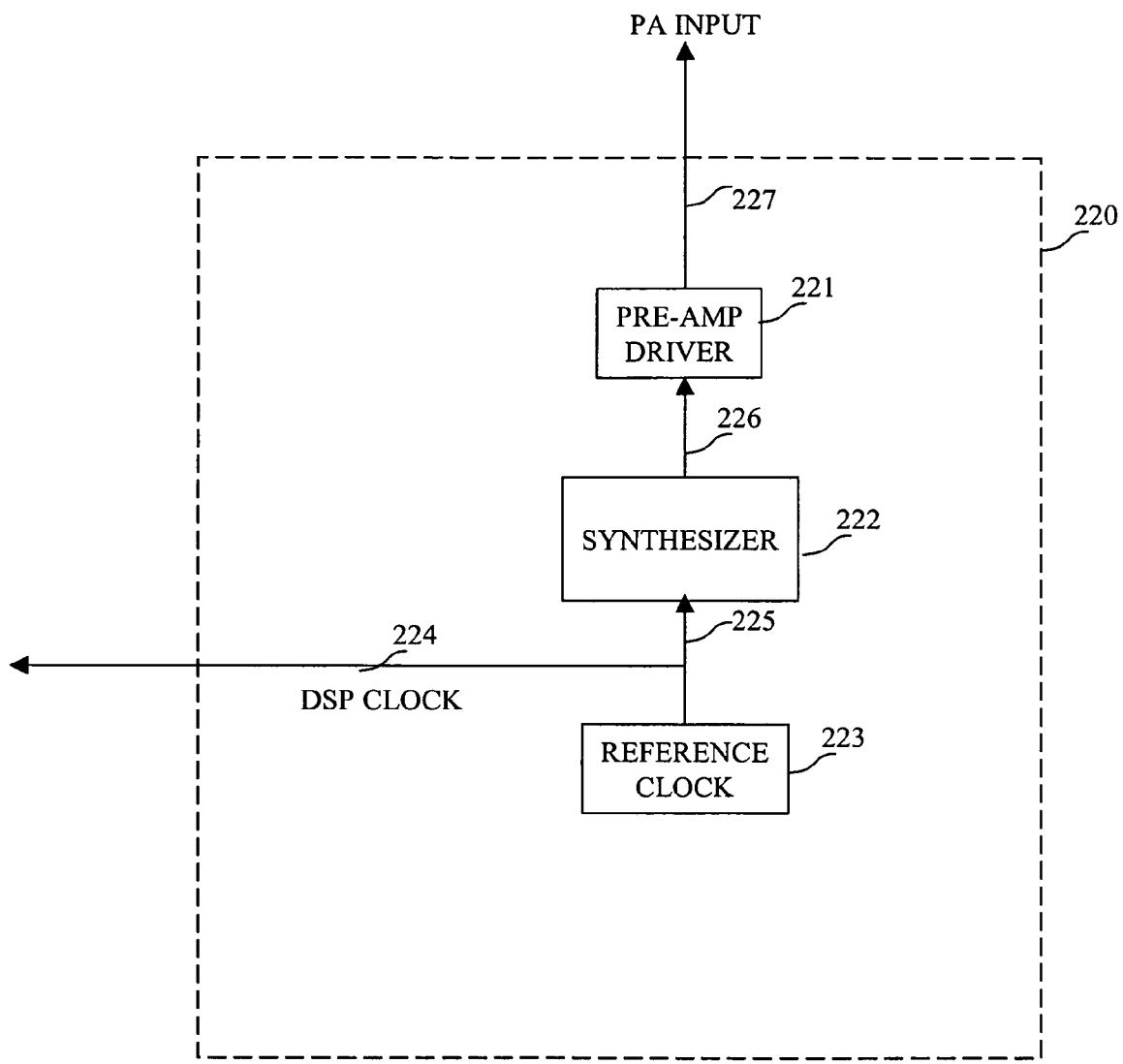
FIG. 2 is a simplified schematic diagram of an embodiment of a carrier signal generator in FIG. 1.

Referring also to FIG. 2, the transmitter 200 also comprises a carrier signal generator 220 that is coupled to the input 213 of the PA system 210. The carrier signal generator 220 may include a reference clock 223 coupled to a synthesizer 222 which is then coupled to a pre-amplifier 221. The reference clock 223 may be a 20 MHz clock with a total tolerance that is compliant with local regulations and RFID protocol standards. After sufficient buffering, the reference clock signal also drives a clock signal 224 in the controller 500. The synthesizer 222 is able to generate frequencies in the range of 860 MHz to 930 MHz with a step size of 250 kHz for FCC regulated areas or 200 kHz for ETSI regulated areas or smaller that is equal to 20 MzHz divided by a whole number. The synthesizer 222 uses the 20 MHz reference clock signal as its reference input 225 and outputs a VCO signal 226. The pre-amplifier amplifies the VCO signal 226 for input 213 to the PA system 210. The transmitter 200 may also comprise a temperature sensor 290 that is coupled to the controller 500 and provides its output to the controller.

Figure 3:
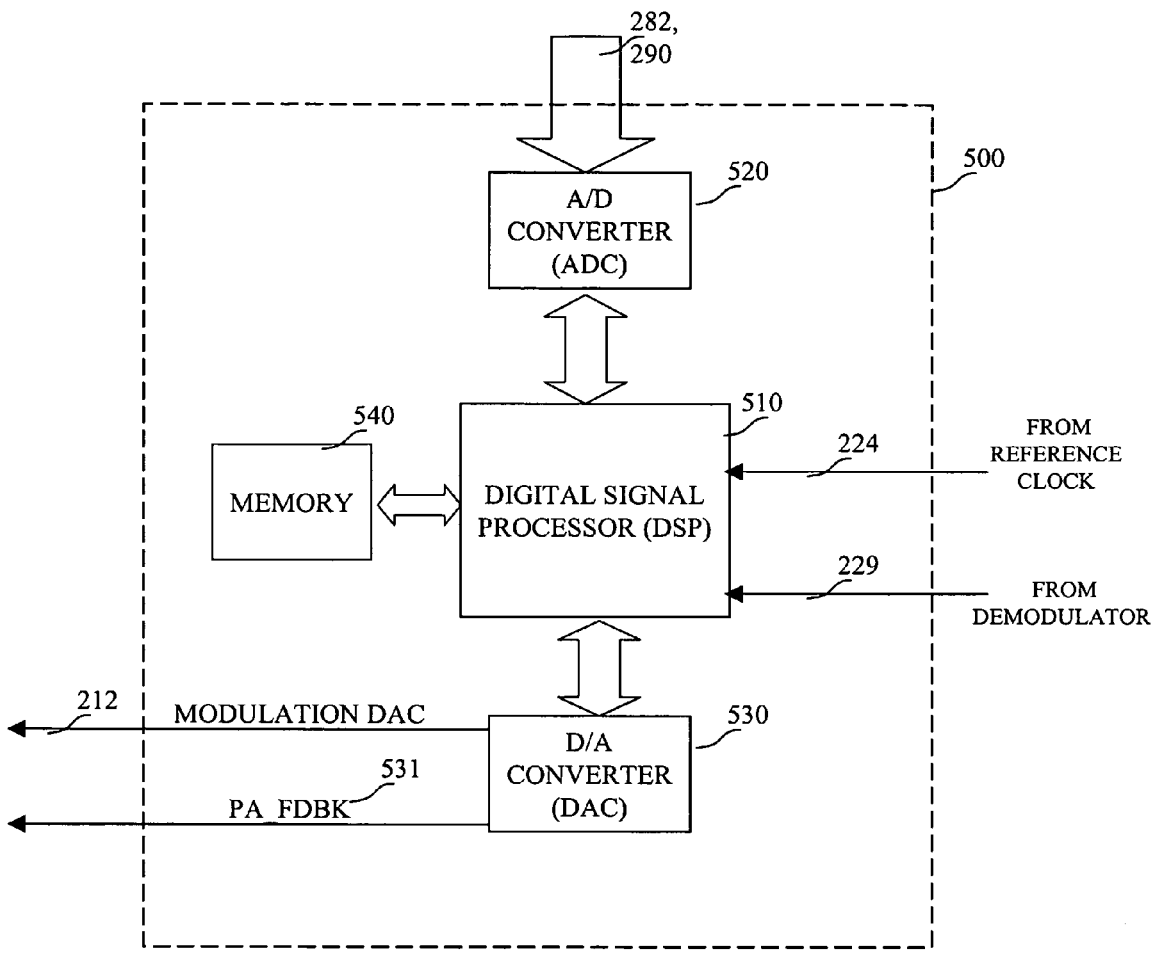
FIG. 3 is a simplified schematic diagram of an embodiment of a controller in FIG. 1.

Referring also to FIG. 3, the controller 500 comprises a digital signal processor (DSP) 510 coupled to an analog-todigital converter (ADC) 520, a digital-to-analog converter (DAC) 530, and memory 540. The DSP's timing is driven by the reference clock of the carrier signal generator 220. The output 229 of the demodulator 40 is also coupled to the DSP 510. The ADC 520 receives analog signals from various components of the RFID reader 100 and converts these signals to digital signals so that the DSP 510 can evaluate and process the data. The DAC 530 converts digital signals from the DSP 510 to analog signals to control the various components of the reader 100. It is understood that the controller 500 may include other circuitry that supports communications between the DSP 510 and other components of the reader and that other types of microcontrollers can be use that provide similar functionality.

In operation, the carrier signal generator 220 generates a radio frequency (RF) carrier signal 227 that is provided to the PA system 210 to modulate with an information signal generated by the controller. The transmission output signal 214 from the PA system 210 of the transmitter 200 includes the carrier signal 227 modulated by the information signal. The method of modulation will be described in detail below. The transmission output signal 214 is radiated by the antenna 270 to an RF transponder or RFID tag (not shown). The signal radiated back from the RFID tag in response to the transmitted signal is captured by the antenna 270 and delivered to the receiver 300 by the reverse power tap 280. The receiver 300 is operable to mix the received signal with components of the LO signal provided by the step attenuator 240. The resultant baseband signals may be further demodulated by the demodulator 400 and the data extracted by the controller 500 for further processing. Details of the PA system 210 and operations thereof are described below with reference to FIGS. 4-7.

Figure 4:
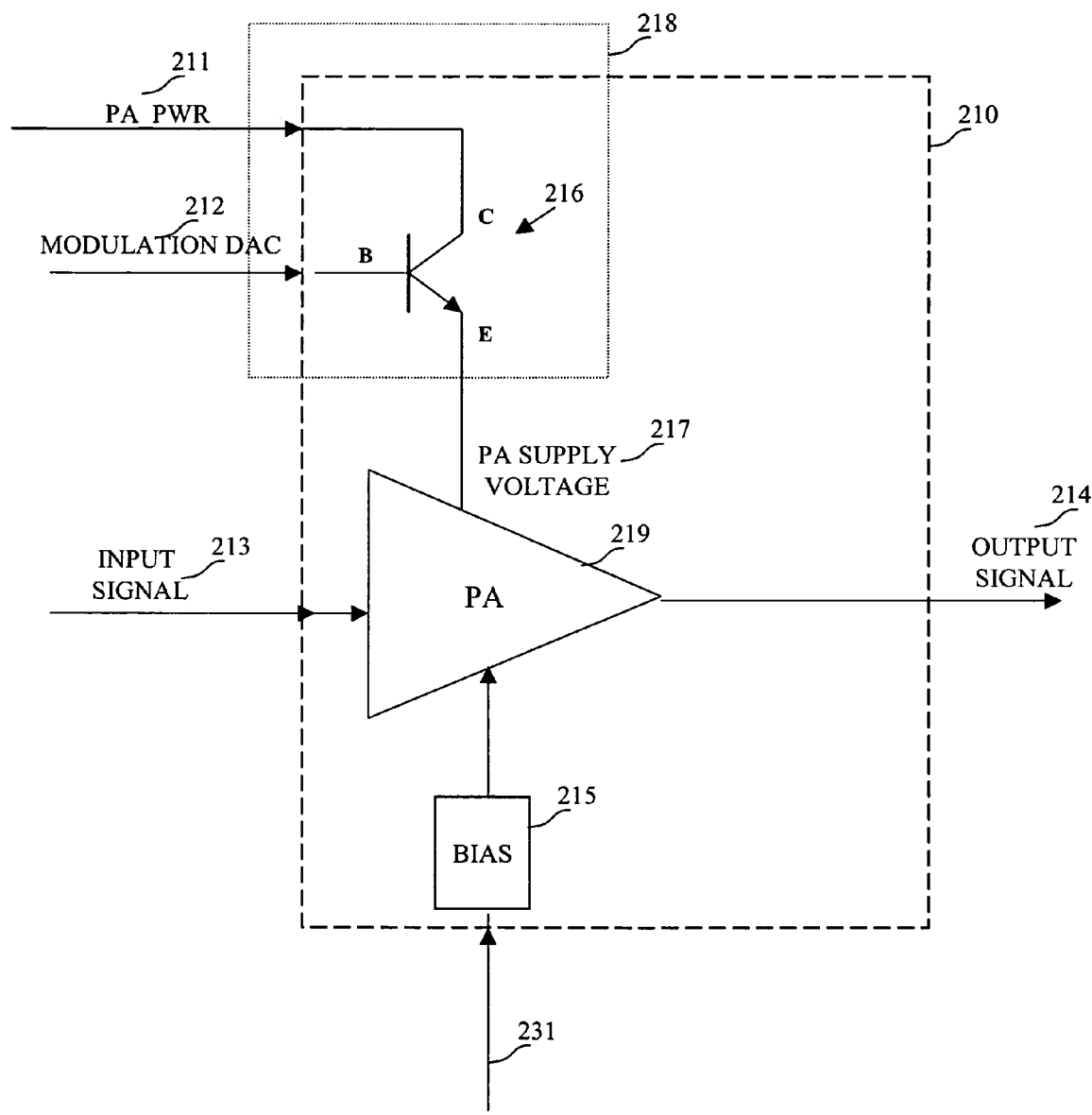
FIG. 4 is a simplified schematic diagram of an embodiment of a power amplifier system of a transmitter in FIG. 1.

FIG. 4 is a simplified schematic diagram of the PA system 210 of the transmitter 200 in FIG. 1. The PA system 210 comprises a class-C power amplifier 219, a transistor 216 having an emitter-follower configuration 218, and an input 231 to a bias circuit 215. Alternatively, the transistor 216 may have a source-follower configuration. As stated above, the transmission output signal 214 from the PA system 210 of the transmitter 200 includes the carrier signal 227 modulated by the information signal. The carrier signal 227 is generated by the carrier signal generator 220 and is coupled to the input 213 of the PA 219. The information signal is generated by the controller 500 and is called MODULATION DAC 212. This signal 212 is coupled to the base of the transistor 216. A supply signal 211, PA_PWR that is controlled by the DSP 510, is coupled to the collector of the transistor 216.

Amplitude modulation (AM) takes place by changing a DC power supply voltage 217 of the PA 219. This is accomplished by driving the voltage for the emitter-follower circuit 218 with the MODULATION DAC signal 212. A signal that is not modulated is generated by driving the emitter-follower circuit 218 to the high side of the power supply voltage 211. Thus, the voltage level of PA_PWR 211 determines the output power of the PA 219. The output signal 214 of PA 219 is a continuous wave (CW) RF signal since PA_PWR 211 is such that the emitter voltage reaches its ceiling. In order for the PA 219 to modulate the signal 227, the DSP 510 (FIG. 2) has access to the DAC 530 and generates the MODULATION DAC 212 signal. The output at the emitter which is the supply voltage 217 of PA 219 follows the input at the base which is the MODULATION DAC waveform 212. The emitter voltage decreases depending on the required modulation depth. As a result, the DSP 510 is capable of shaping the modulation spectrum to achieve a bandwidth compliant with regulations and produces very linear modulation. Alternatively, if there is any deviation of linearity then the DSP 510 can pre-distort the information (MODULATION DAC) waveform 212 so that the net result is a very linear operation. The DSP 510 can also implement PA 219 on/off functionality and power ramping requirements by using the MODULATION DAC signal 212.

Additionally, phase modulation can also be implemented by this configuration. This is accomplished by hard-switching the phase of the input signal 213 to the PA 219 and at the same time shaping the envelope of the carrier signal by the method discussed above. Hard-switching the phase is done by inverting the input signal so that there is a hard toggle between 0 and 180 degrees. The resulting modulation is a true phase-reversal amplitude shift keying (PRASK) modulation as described in the C1G2 Electronic Product Code (EPC) standard for RFID.

Figure 5:
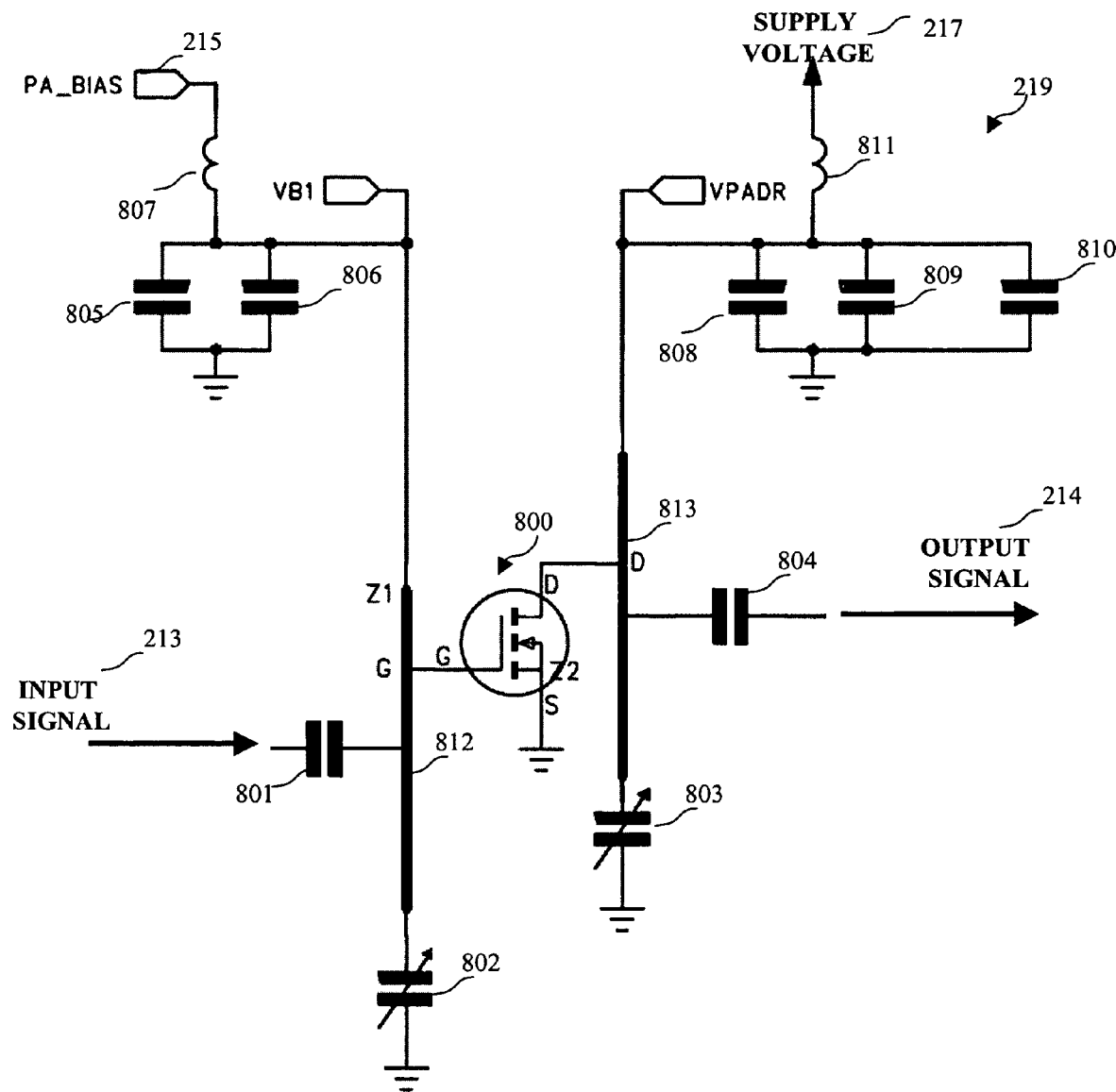
FIG. 5 is a detailed circuit diagram of an embodiment of a power amplifier in FIG. 4.

FIG. 5 is a detailed circuit diagram of the power amplifier in FIG. 4. The PA 219 operates in Class-C mode and thus, is classified as a Class-C power amplifier. The PA 219 comprises a transistor 800 having a gate, source, and drain. As an example, the transistor 800 may be a common source N-channel enhancement mode MOSFET. It is understood that the other types of transistors may be used to provide the same functionality for the power amplifier. The gate of the transistor 800 is coupled to a transmission line/inductor 812. The transmission line/inductor 812 is coupled to a capacitor 801 which is coupled to the input signal 213 of the PA 219. The transmission line/inductor 812 is also coupled to a variable capacitor 802, capacitors 805, 806, and an inductor 807. The other side of the capacitor 802 is coupled to ground. The capacitors 805 and 806 are coupled in parallel with each other with the other side coupled to ground. The other side of the inductor 807 is coupled to the bias circuit 215. The source of the transistor 800 is coupled to ground. The drain of the transistor 800 is coupled to a transmission line/inductor 813 which is coupled to a variable capacitor 803, capacitors 804, 808, 809, 810, and an inductor 811. The capacitors 808, 809, and 810 are coupled in parallel with each other with the other side coupled to ground. The other side of the inductor 811 is coupled to the supply voltage 217. The other side of capacitor 804 is coupled to the output signal 214 of the PA 219.

The PA 219 operates in Class-C mode to achieve high efficiency resulting in low power consumption. To facilitate proper power amplifier operation, the PA 219 utilizes high-Q LC tank circuits both at the input 213 and at the output 214. Q represents a quality factor of the tank circuit and is defined as the ratio of energy stored during one complete RF cycle to energy consumed. Thus, using high-Q LC tank circuits means that there is little loss in the input and output which provides for proper tuning and impedance matching of the PA 219. For Class-C operation, the gate DC bias voltage is set just below the transistor 800 pinch-off point such that the PA 219 does not draw a drain current without a drive signal. With a sufficiently high level input signal 213, the transistor 800 may operate in a saturation region. Biasing is implemented by the bias circuit 215 which comprises a digital or analog potentiometer to allow for adjustment of this gate voltage.

The consequence of using the Class-C amplifier as described above is that linearity is extremely poor because the conduction angle is much less than 180 degrees. Thus, Class-C amplifiers are not suitable for amplifying amplitude-modulated signals. In order to remedy this, modulation is performed by changing (modulating) the power supply voltage 217 as discussed above in FIG. 4. Therefore, the configuration of the PA system 210 allows for low DC power consumption because of Class-C operation for the PA 219 and highly controlled amplitude wave shaping by means of the drain envelope modulator 218. Because the PA 219 has low DC power consumption and the PA is the largest contributor to the overall power consumption of the RFID reader 100, this allows the reader to be operated under Power over Ethernet (PoE) specifications while using a full maximum output power as specified by local regulations. According to IEEE 802.11af, PoE allows for a maximum of approximately 13 Watts of available DC power. Thus, the existing Ethernet wiring can supply the DC voltage for the RFID reader without a need for a complete power supply infrastructure.

Figure 6:
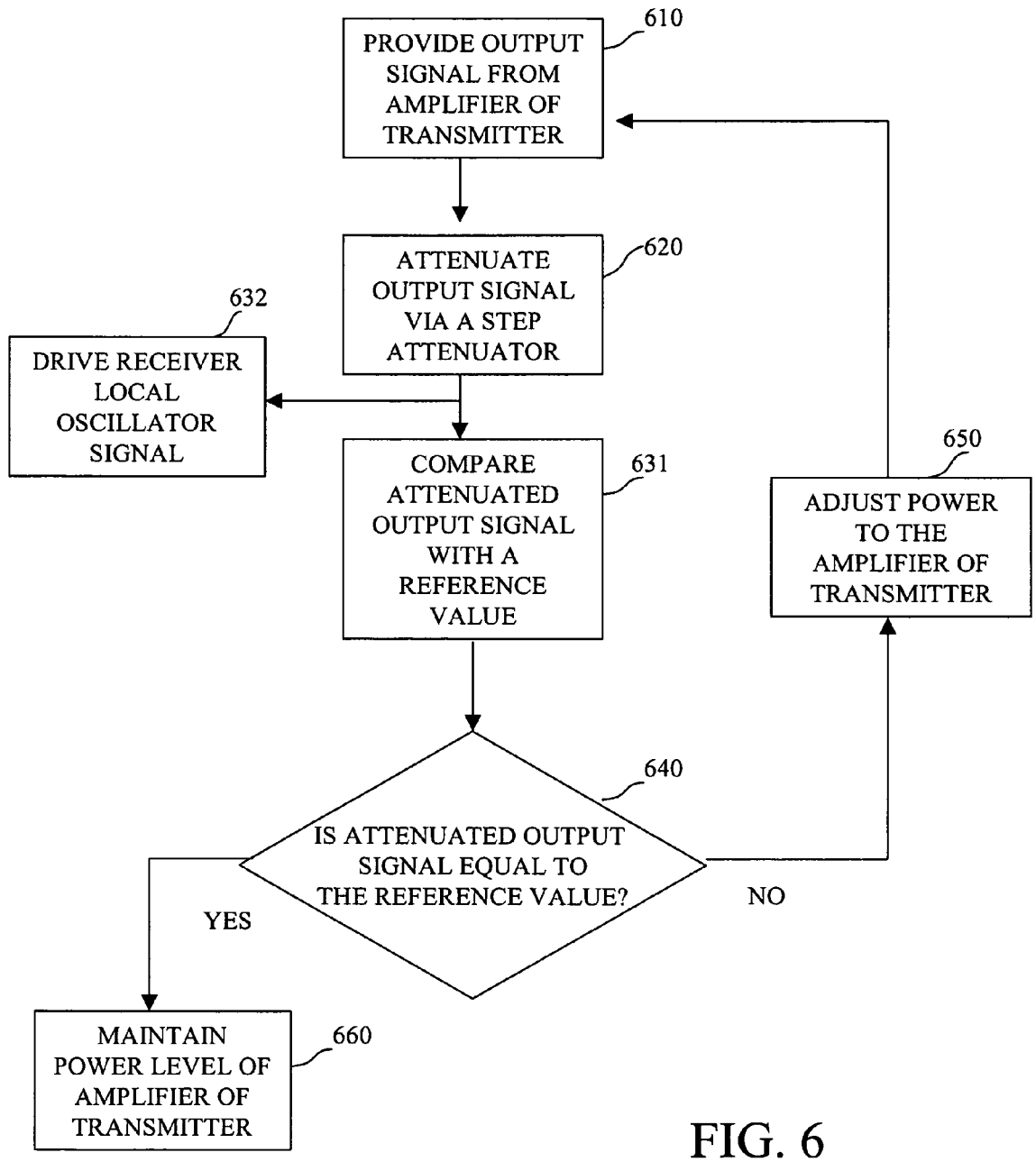
FIG. 6 is a simplified flowchart of an embodiment of a method for controlling output power of an RFID reader.

FIG. 6 is a simplified flowchart of an embodiment of a method for controlling output power of the RFID reader 100. Referring also to FIGS. 1-3, in block 610, a power control loop starts by providing a portion of the output signal 214 from the PA 219 of the transmitter 200. This is provided by the directional coupler of the forward power tap 230. In block 620, the output signal is then attenuated by the step attenuator 240. The step attenuator 240 may be any commercially available, off-the-shelf calibrated, programmable attenuator which provides accurate steps of attenuation. An example is a 32-step programmable attenuator with steps of 1 dB. The output of the programmable step attenuator is split. In block 632, part of the attenuated output signal 244 drives the LO signal of the receiver 300 of the reader 100. In block 631, part of the attenuated output signal 242 is fed into the power detector 250 where the output signal is detected (or rectified). The rectified power detector output is fed into the ADC 520 of the controller 500 which provides a measured number representing a power level of the attenuated output signal.

The controller 500 includes the DSP 510 that compares the measured number with a reference value stored in memory 540 of the controller 500. The reference value is determined during calibration which is described in detail below. In decision block 640, the DSP 510 determines whether the measured number is equal to the reference value. In block 650, if drift is detected between the measured number and the reference value, a power supply voltage to the power amplifier can be adjusted accordingly. The controller 500 includes the DAC 530 by which the DSP 510 generates a signal called PA_FDBK 531. The voltage level of PA_FDBK 531 is dependent on the amount of drift that was detected. The DSP 530 includes firmware that determines D/A values based on A/D values. The PA_FDBK signal 531 in turn generates the power supply voltage called PA_PWR 211 which is fed back into the PA system 210 of the transmitter 200 closing the power control loop. This PA_PWR 211 voltage signal is generated by a regulator in response to a request voltage signal, PA_FDBK 531. The PA_PWR 211 will be adjusted until the attenuated output signal is equal to the reference value stored in the controller. In block 660, when the attenuated output signal (measured value) is equal to the reference value the power level 217 to the PA 219 is maintained the same. As a result, the power control loop tries to get a constant power level going into the power detector 250.

Figure 7:
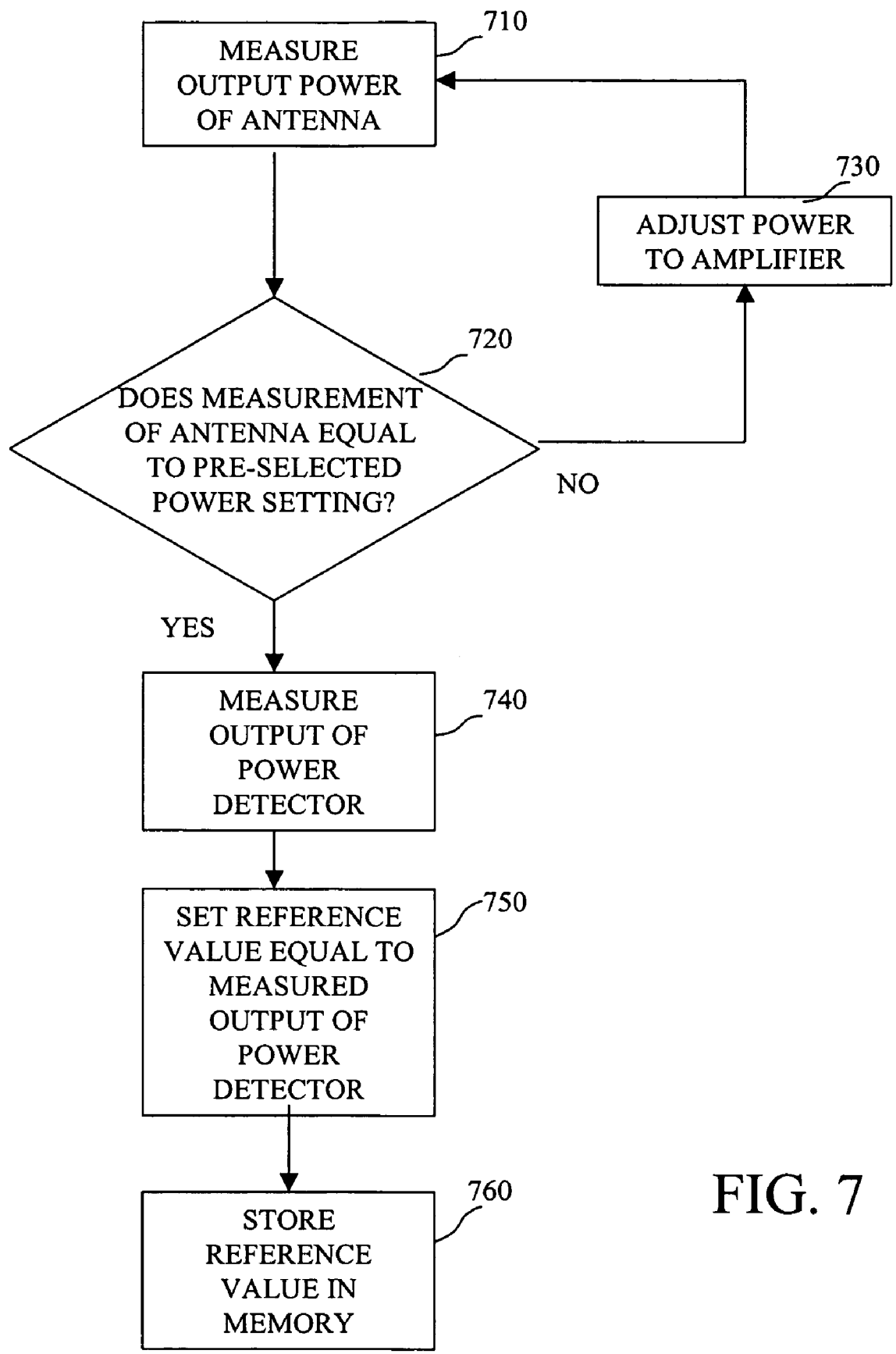
FIG. 7 is a simplified flowchart of an embodiment of a method for calibrating an RFID reader.

As noted above, the reference value is calibrated one time during production. The only time the RFID reader 100 is actively controlling the power is when the output signal 214 of the amplifier 219 is a continuous wave (CW) RF signal or in other words not modulating. Thus, the PA_PWR 211 voltage signal supplied to the PA system 210 directly translates to a certain output power that is transmitted or radiated by the RFID reader 100. FIG. 7 is a simplified flowchart of an embodiment of a method for calibrating an RFID reader 100. In block 710, a measurement is taken from the antenna 270 of the RFID reader 100 to determine the output power. In decision block 720, it is determined whether the measurement equals a pre-selected power setting, for example, 1 Watt coming off the antenna 270. In block 730, if the measurement does not equal the pre-selected power setting then the power signal, PA_PWR 211 is adjusted accordingly. In block 740, if the measurement equals the pre-selected power setting then the output power of the power detector 250 is measured. In block 750, the reference value is calibrated by setting the reference value to this measured value of the power detector 250. In block 760, the reference value is stored in memory 540 of the controller 500. Thus, the stored reference value represents what is needed at the output of the power detector 250 to get 1 Watt coming off the antenna 270. The calibration process is done with a certain setting for the step attenuator 240. This setting is also stored in memory 540 for use during execution of the power control loop any time the calibrated power level has to be reproduced. The DAC value that is necessary for proper supply voltage setting may also be stored in memory for use during start-up.

The calibration process discussed above allows for accurate power setting and accurate steps in power setting without having to recalibrate the reference value for each power setting step. Continuing with the example above, during start-up the power control loop can be improved by using best estimate start-up values that were determined during calibration and stored in memory 540. Additionally, an operating temperature measured by the sensor 290 is made available to the DSP 510 during start-up which allows the DSP to compensate the best estimate start-up values according to know temperature-power dependencies. The RFID reader 100 is calibrated to transmit 1 Watt off the antenna 270 and the step attenuator 240 is set by the DSP 510. If the desired output power is ½ Watt which is 3 dB lower than 1 Watt, the programmable step attenuator 240 (steps of 1 dB) is set 3 dB different from what the attenuator was set for 1 Watt. The power detector 250 in the power control loop still tries to get to the same reference value that was stored in memory but in this situation there is less attenuation (3 dB less) than before. The power control loop will try to get the power level going into the attenuator 3 dB lower which means that the output signal coming off the antenna 270 is 3 dB lower than the calibrated 1 Watt value. Thus, the power setting of the RFID reader 100 accurately follows each step of the programmable step attenuator 240 without having to recalibrate the reference value for each power setting step.

As discussed above, referring again to FIG. 1, part of the attenuated output signal 244 is used to drive the LO signal for the receiver 300. The fact that the power control loop tries to get the power level going into the power detector 250 at one constant level means that the power level going to the receiver LO is also constant with the same value. This guarantees a proper level going into mixers of the receiver 300 which is an advantage of implementing the power control loop. The power level going to the receiver LO is constant only during reception where the output signal is CW. During transmission, if the output signal 214 was modulated then the receiver LO signal would also be modulated and this would not work for the receiver 300. However, with RFID, the reader 100 never receives signals when the reader is transmitting signals. Thus, the power control loop provides for proper receiver operation using the attenuated output signal 244 to drive the receiver LO signal.

Additionally, in RFID, one factor that must be accounted for is how the transmitter 200 is affecting noise input into the receiver 300. Driving the receiver LO by the method discussed above, cancels out noise that may be generated by the power amplifier 219 and increases receiver 300 sensitivity. For an RFID backscatter homodyne based system, frequency changes (and phase changes) in the transmitted RF signal will cancel out with the received tag signal as long as the transmitted signal is derived from the same frequency source (carrier signal generator 220) as the LO signal for the receiver 300 mixers. However, added phase noise that are generated in active elements, such as amplifiers, that come after a master oscillator will not cancel out if the receiver LO signal was derived directly from the master oscillator. The present arrangement of the power control loop solves the added phase noise problem because the receiver LO signal is driven by the attenuated output signal 244 that comes after the power amplifier system 210 of the transmitter 200. Thus, the power control loop provides for phase noise cancellation that may be generated by the transmitter 200 resulting in an increase in RF signal margin in the receive path. AM noise may not be cancelled out. However, the advantage of using a Class-C amplifier over a Class-A amplifier is that the Class-C amplifier generates lower level AM noise and therefore, results in less deterioration of receiver sensitivity.

The method described herein provides a low-cost and efficient way to control the power output of an RFID reader that allows accurate steps in power settings and at the same time cancels added RF amplifier phase noise in the receiver which increases receiver sensitivity. The method described herein does not require large firmware overhead such as complex algorithms or lookup tables for each power setting or time consuming calibration procedures.

The system described herein provides a high efficiency power amplifier resulting in low power consumption and a highly controlled modulator resulting in very linear modulation. The system described herein is suitable for applications such as Power over Ethernet without the need for a power supply infrastructure. The existing Ethernet wiring is able to supply the DC voltage for the system.

Although embodiments of the present disclosure have been described in detail, those skilled in the art should understand that various changes, substitutions and alterations may be made without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A method for use in an RFID reader, the method comprising:
   providing an output signal from an amplifier of a transmitter;
   attenuating the output signal via a step attenuator;
   comparing the attenuated output signal to a reference value; and
   adjusting power to the amplifier until the attenuated output signal is substantially equal to the reference value;
   wherein the attenuated output signal drives a local oscillator signal of a receiver thereby canceling noise generated by the transmitter in the receiver.

2. The method of claim 1, wherein the output signal of the transmitter and the local oscillator signal of the receiver are derived from a common frequency source.

3. The method of claim 1, wherein the output signal is a continuous wave during reception.

4. The method of claim 1, wherein the output signal is a modulated signal during transmission of data.

5. The method of claim 4, wherein the modulated signal is generated by changing a power supply voltage of the amplifier.

6. The method of claim 1, wherein the step attenuator is programmable for accurate dB steps.

7. The method of claim 6, wherein the reference value is determined one time during calibration and corresponds to an output power level of the transmitter.

8. The method of claim 7, wherein the output power level follows each dB step of the step attenuator without having to recalibrate the reference value.

9. The method of claim 1, wherein the amplifier is a Class-C power amplifier.

10. The method of claim 1, wherein comparing and adjusting power to the amplifier is performed by a controller.

11. The method of claim 10, further comprising:
    storing the reference value that was determined during calibration in the controller;
    using a stored power setting DAC value during start-up to improve start-up behavior of the RFID reader; and
    using an operating temperature measurement during start-up to improve start-up behavior of the RFID reader, wherein the controller compensates power to the amplifier according to known power-temperature dependencies.

12. An apparatus for use in an RFID reader, the apparatus comprising:
    a power amplifier of a transmitter having an output signal;
    a programmable step attenuator attenuating the output signal; and
    a controller comparing the attenuated output signal with a reference signal, wherein the controller adjusts power to the amplifier until the attenuated output signal is substantially equal to the reference signal;
    wherein the attenuated output signal is operable to drive a local oscillator signal of a receiver thereby canceling noise generated by the transmitter in the receiver.

13. The apparatus of claim 12, wherein the reference signal is determined one time during calibration of the RFID reader and wherein, after calibration, the output signal accurately follows each step of the programmable step attenuator.

14. The apparatus of claim 12, wherein the output signal of the transmitter and the local oscillator signal of the receiver are derived from a common frequency source.

15. The apparatus of claim 12, wherein the output signal is a continuous wave during reception.

16. The apparatus of claim 12, wherein the output signal is a modulated signal during transmission of data.

17. A system, comprising:
    a transmitter having a power amplifier with an output signal;
    a programmable step attenuator attenuating the output signal;
    a controller that compares the attenuated output signal with a reference value, wherein the controller adjusts power to the amplifier until the attenuated output signal is substantially equal to the reference signal;
    a receiver having a local oscillator signal that is driven by the attenuated output signal, wherein the output signal of the transmitter and the local oscillator signal of the receiver are derived from a common frequency source thereby canceling noise generated by the transmitter in the receiver.

18. The system of claim 17, further comprising a memory for storing the reference value, wherein the reference signal is determined one time during calibration of the RFID reader.

19. The system of claim 18, wherein, after calibration, the output signal accurately follows each step of the programmable step attenuator.

20. The system of claim 17, wherein the output signal is a continuous wave during reception.

* * * * *